United States Patent
De Pasquale

(10) Patent No.: US 9,928,657 B2
(45) Date of Patent: Mar. 27, 2018

(54) MUSEUM AUGMENTED REALITY PROGRAM

(71) Applicant: ARM23, LLC, Maitland, FL (US)

(72) Inventor: Achille De Pasquale, Catania (IT)

(73) Assignee: ARM23, SRL, Milan, MI (IT)

( * ) Notice: Subject to any disclaimer, the term of this patent is extended or adjusted under 35 U.S.C. 154(b) by 0 days.

(21) Appl. No.: 14/926,190

(22) Filed: Oct. 29, 2015

(65) Prior Publication Data

US 2017/0124763 A1    May 4, 2017

(51) Int. Cl.
*G06T 19/00* (2011.01)
*H04L 12/931* (2013.01)

(52) U.S. Cl.
CPC .......... *G06T 19/006* (2013.01); *H04L 49/351* (2013.01)

(58) Field of Classification Search
None
See application file for complete search history.

(56) References Cited

U.S. PATENT DOCUMENTS

| | | | | |
|---|---|---|---|---|
| 2005/0278231 A1* | 12/2005 | Teeter | ................ | G06Q 10/107 705/14.51 |
| 2006/0245225 A1* | 11/2006 | Vorbach | ............. | G06F 9/30036 365/6 |
| 2009/0264070 A1* | 10/2009 | Lim | ................... | G06Q 30/0261 455/41.2 |
| 2011/0066444 A1* | 3/2011 | Fish | ...................... | G06Q 30/02 705/1.1 |
| 2012/0019557 A1* | 1/2012 | Aronsson | ................ | G06T 11/00 345/633 |
| 2014/0063055 A1* | 3/2014 | Osterhout | ............... | G06F 3/005 345/633 |
| 2014/0285519 A1* | 9/2014 | Uusitalo | ............... | G06T 19/006 345/633 |

OTHER PUBLICATIONS

Veracity, "Power over Ethernet (POE) Explained" http://www.veracityglobal.com/resources/articles-and-white-papers/poe-explained-part-1.aspx, Jun. 27, 2013.*
Microsoft, ".NET Gadgeteer Module Builder's Guide" Version 1.10, Apr. 19, 2013.*

* cited by examiner

*Primary Examiner* — Nicholas R Wilson
(74) *Attorney, Agent, or Firm* — Albert Bordas, P.A.

(57) ABSTRACT

A museum augmented reality platform that interacts between computer devices and a server via a communication network. The augmented reality platform includes a multimedia recognition application located on the computer device, which receives live, real-time content and converts it into coordinates, and a client application located on the computer devices that transmit raw data packets including the coordinates. A server application provided on the server receives the data packets from the client application, recognizes content, and sends the content or other information to the computer devices in accordance with the source.

3 Claims, 5 Drawing Sheets

MUSEUM AUGMENTED REALITY PROGRAM

BACKGROUND OF THE INVENTION

1. Field of the Invention

The present invention relates to augmented reality platforms, and more particularly, to augmented reality platforms incorporated in museum environments.

2. Description of the Related Art

Augmentation of reality has gone through trial and error over the last few decades, unable to locate a proper niche market regardless of the promising and profound technical boundaries it widens. Conventional solutions adopted for the recognition of multimedia content comprises use of images as multimedia sources and proprietary libraries for processing information. It implies that the speed of recognition depends on a user's computer. In addition, conventional solutions adopt a recognition that is obtained by comparing results with original source and the quality of results depends by first processing.

Other art describing the closest subject matter provide for a number of more or less complicated features that fail to solve the problem in an efficient and economical way. Applicant is not aware of any art that suggests the novel features of the present invention.

SUMMARY OF THE INVENTION

The present invention comprises innovative hardware to enable high performance and security. Thus, permitting museums the ability to provide enhanced content without error during recognition, while safeguarding proprietary software of the present invention comprising algorithms against hacking activities. An augmented reality platform electronically channels the enrichment of sensory perception using video, graphic, and text elements in a museum environment by incorporating augmented reality technology into computer devices such as smart phones, mobile devices, and/or tablets. The innovative hardware provides an improved solution to speed up recognition objects for augmented reality. In particular, the innovative hardware comprises filters for improved multimedia recognition. Specifically, boards are interconnected through a bus for parallel processing, allowing an application of different filters in combination. Thus, obtaining optimal performance with parallel processing. These boards use personalized filters in function of a condition of the content including parameters as contrast, saturation, brightness, exposure, highlights, shadows, sharpness, noise and others to improve the performance of the recognition and full scalability enabled by interconnected cards with the option to add new filters based on a type of content to be processed.

The augmented reality platforms of the present invention enhance experiences with artwork including, but not limited to, paintings, sculptures, relics, and photos, and/or cultural sites, making didactical and educational moments fun and interactive. In a preferred embodiment, a ticket is purchased providing entrance to the museum. By means of a barcode, such as a quick response "QR" code, a visitor has access to download an augmented reality platform software application onto his/her computer device. Once downloaded, the visitor may experience the enrichment of sensory perception using video, graphic, and text elements. As an example, the visitor may learn about hidden stories behind each artwork and/or cultural site in a completely new interactive way. Furthermore, the augmented reality platform software offers visitors thematic paths, videos, details, games, and gift shop management. With gift shop management, a visitor may be prompted to preselect, or may otherwise search for replica goods and/or memorabilia of desired works for purchase at a museum gift shop. The present invention also comprises functionalities, including content and information provided by sign language, to increase a visitor's involvement, making their visit to a museum unique.

More specifically, the present invention as an augmented reality platform, is in the technical field of multimedia processing for recognition contents. The present invention comprises a unique and innovative recognition system based on comparison between an original sample and a current data packet processed in different conditions through filters, whereby the present invention additionally saves and uses processed data in further processing. It is noted that conditions for acquiring media may change over time. As an example, in a museum environment, there are different positions of a visitor, also defined as an observer, for images, or ambient noise for sounds considering the computer used and a desired signal-to-noise ratio. The present invention comprises filters to improve the quality of information received prior to recognition.

The process is comprised of a series of stages:
A) acquiring real-time multimedia content;
B) decoding of the real-time multimedia content;
C) applying filters to improve the real-time multimedia content;
D) elaborating of preprocessed data to recognize a target; and
E) transmitting information to a module used to recognize the same, whereby the real-time multimedia content can be audio, video, text, image, and/or three-dimensional objects.

The present invention therefore revolutionizes the way visitors experience museums. It provides visitors with multiple perspectives on artwork and/or cultural sites, bringing them closer. The present invention shifts the focus to the education of the visitors, while creating a new business model for museums to increase their revenue.

It is therefore one of the main objects of the present invention to provide augmented reality platforms in museum environments.

It is another object of this invention to provide augmented reality platforms comprising hardware to enable high performance and security during a visitor's experience at a museum.

It is another object of this invention to provide augmented reality platforms that electronically channel the enrichment of sensory perception using video, graphic, and text elements in a museum environment.

It is another object of this invention to provide augmented reality platforms that incorporate augmented reality technology into computer devices such as smart phones, mobile devices, and/or tablets.

It is another object of this invention to provide augmented reality platforms comprising filters for improved multimedia recognition, whereby boards are interconnected through a bus for parallel processing, allowing an application of different filters in combination.

It is another object of this invention to provide augmented reality platforms that obtain optimal performance with parallel processing, whereby boards use personalized filters in function of a condition of the content including parameters as contrast, saturation, brightness, exposure, highlights, shadows, sharpness, noise and others to improve the performance of recognition, full scalability enabled by interconnect cards, and the option to add new filters based on a type of content to be processed.

It is yet another object of this invention to provide such augmented reality platforms that are inexpensive to implement and maintain while retaining their effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
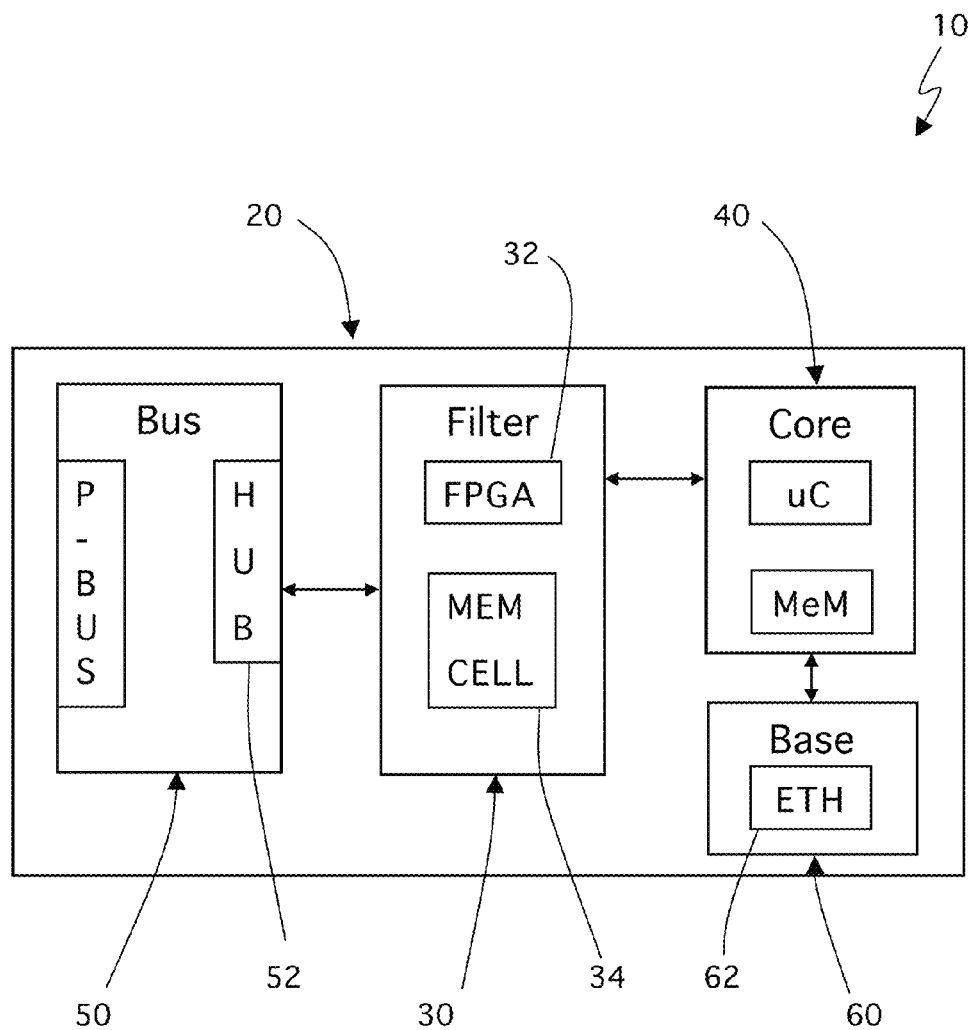
FIG. 1 is a block diagram of an augmented reality board of the present invention.

Referring now to the drawings, the present invention is a museum augmented reality platform, and is generally referred to with numeral 10. It can be observed that it basically includes augmented reality board 20.

As seen in FIG. 1, augmented reality board 20 comprises at least one filter module 30 that can be differentiated based on Field Programmable Gate Array "FPGA" technology module 32 where filter module 30 is synthesized to process data. After processing the data, it is transmitted to core module 40 composed of microcontrollers that manage information and compares a result with contents in its database.

A plurality of augmented reality boards 20 can be connected together with bus modules 50. An interconnection with the outside is possible via base module 60 that provides Ethernet interface 62 and electronics for a power supply to each augmented reality board 20. Advantages of augmented reality boards 20 are the possibility of adding specific filter modules 30, depending on content type, which can act simultaneously. The use of FPGA technology module 32 allows much higher performance with the ability to provide real-time results. The use of different filter modules 30 adds an advantage of processing data even in non-optimal conditions.

Figure 2:
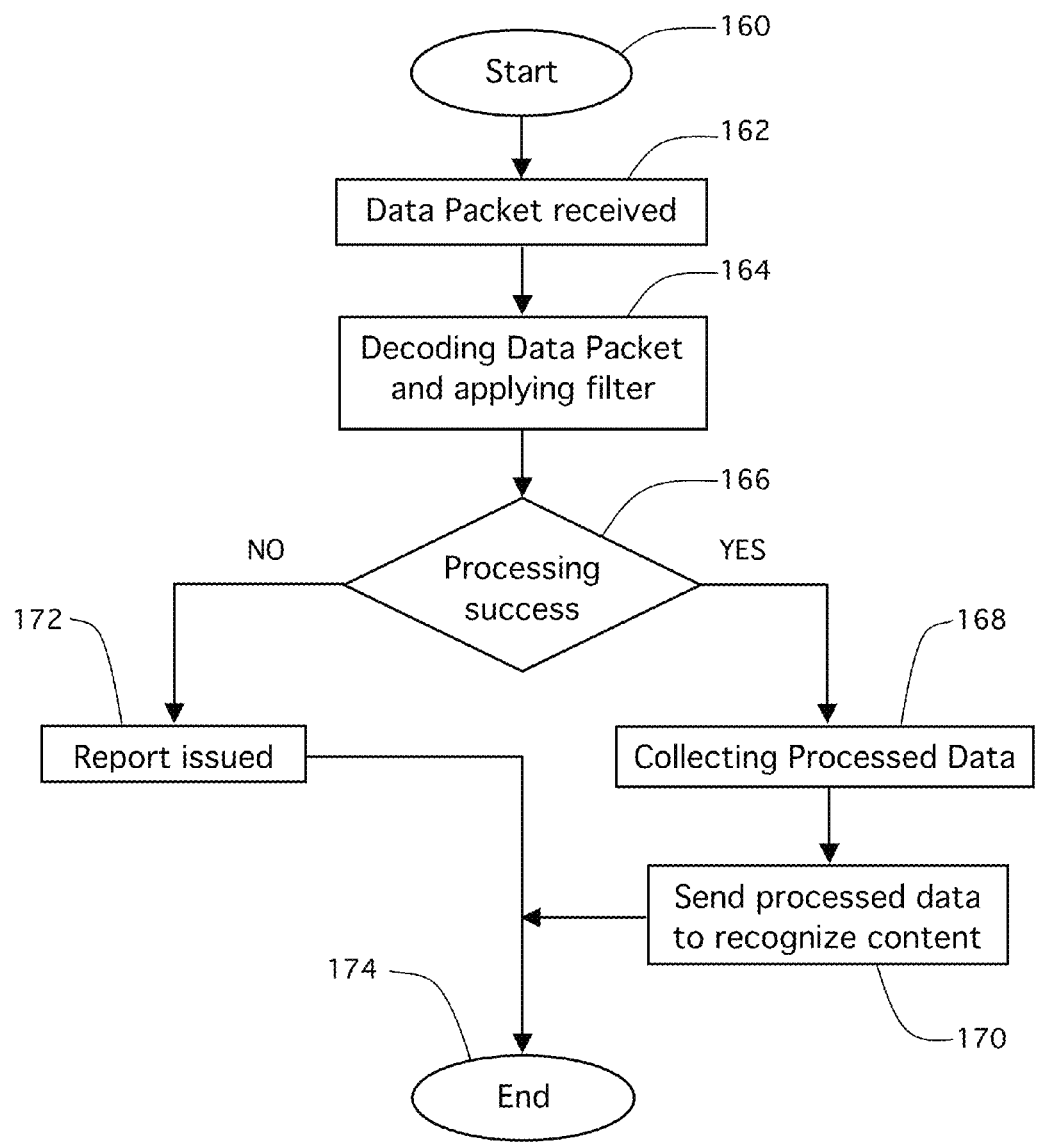
FIG. 2 is a process flowchart of the present invention.

As seen in FIGS. 1 and 2, step 160 defines a starting point of operation, whereby at step 162 bus module 50 receives a raw data packet and transmits it via hub 52.

After receiving the raw data packet, at step 164 augmented reality board 20 decodes the raw data packet and applies a respective filter module 30.

The raw data packet is processed in filter module 30, whereby it contains FPGA technology module 32 where filter module 30 is synthesized.

At step 166 if the processing in filter module 30 is successful, at step 168 there is collecting of processed data, whereby memory cell 34 contains expandable logic cells to implement static memory for FPGA technology module 32. After processing the data, at step 170 results are sent to core module 40 that communicates strictly with application server 70 comprising Ethernet peripheral 72, seen in FIG. 3, and at step 174 end. After that, application server 70 receives results from core module 40, application server 70 sends multimedia content relating to the recognized target T to computer devices 250, 260, and 270, seen in FIG. 3.

Figure 3:
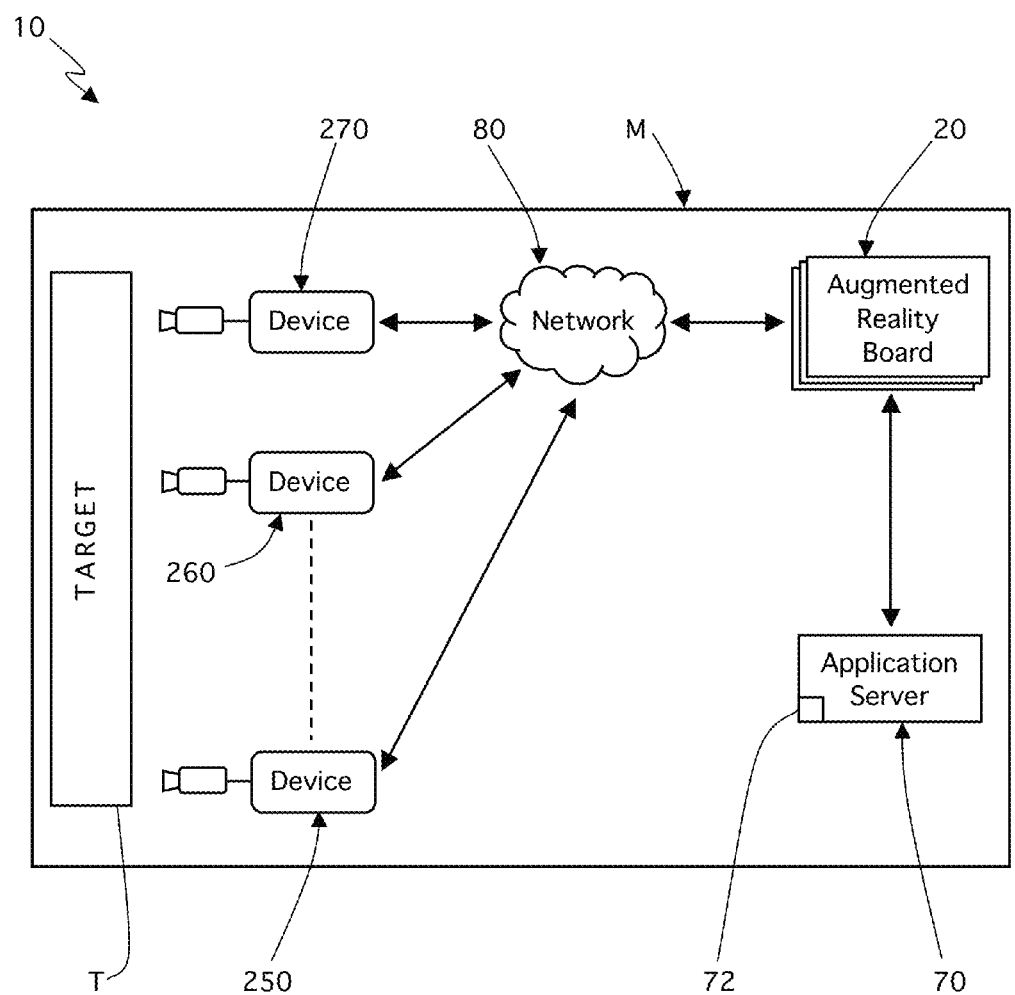
FIG. 3 is a schema view of data packet communications.

At step 166 if the processing in filter module 30 is not successful, at step 172 a report is issued and application server 70, seen in FIG. 3, can evaluate the results to recognize content and at step 174 end.

As seen in FIG. 3, present invention 10 in a recognition process at museum M, adopts different formats of raw data packets including images and streaming of data of target T as multimedia sources transmit the raw data packets via a wired or wireless network 80 to analyze content in real time using augmented reality board 20. Target T is artwork including, but not limited to, a painting, sculpture, relic, and photo, and/or cultural site. For purposes of example, only three computer devices 250, 260, and 270 are illustrated. It is understood that present invention 10 is capable of handling multitudes of visitors with their respective computer devices attending museums M on any given day. Computer devices 250, 260, and 270 can be any computer such as a smart phone, mobile device, and/or tablet.

Each computer device 250, 260, and/or 270 receives content via its respective input source, such as a microphone and/or camera, and sends raw data packets via wired or wireless network 80 to augmented reality board 20. Augmented reality board 20 processes the raw data packets and sends the results to application server 70 to manage them. Furthermore, augmented reality board 20 receives the raw data packets from computer devices 250, 260, and 270 via the wired or wireless network 80, whereby computer devices 250, 260, and 270 use video cameras as an input source that processes images and/or data streaming before sending it to augmented reality board 20.

Figure 4:
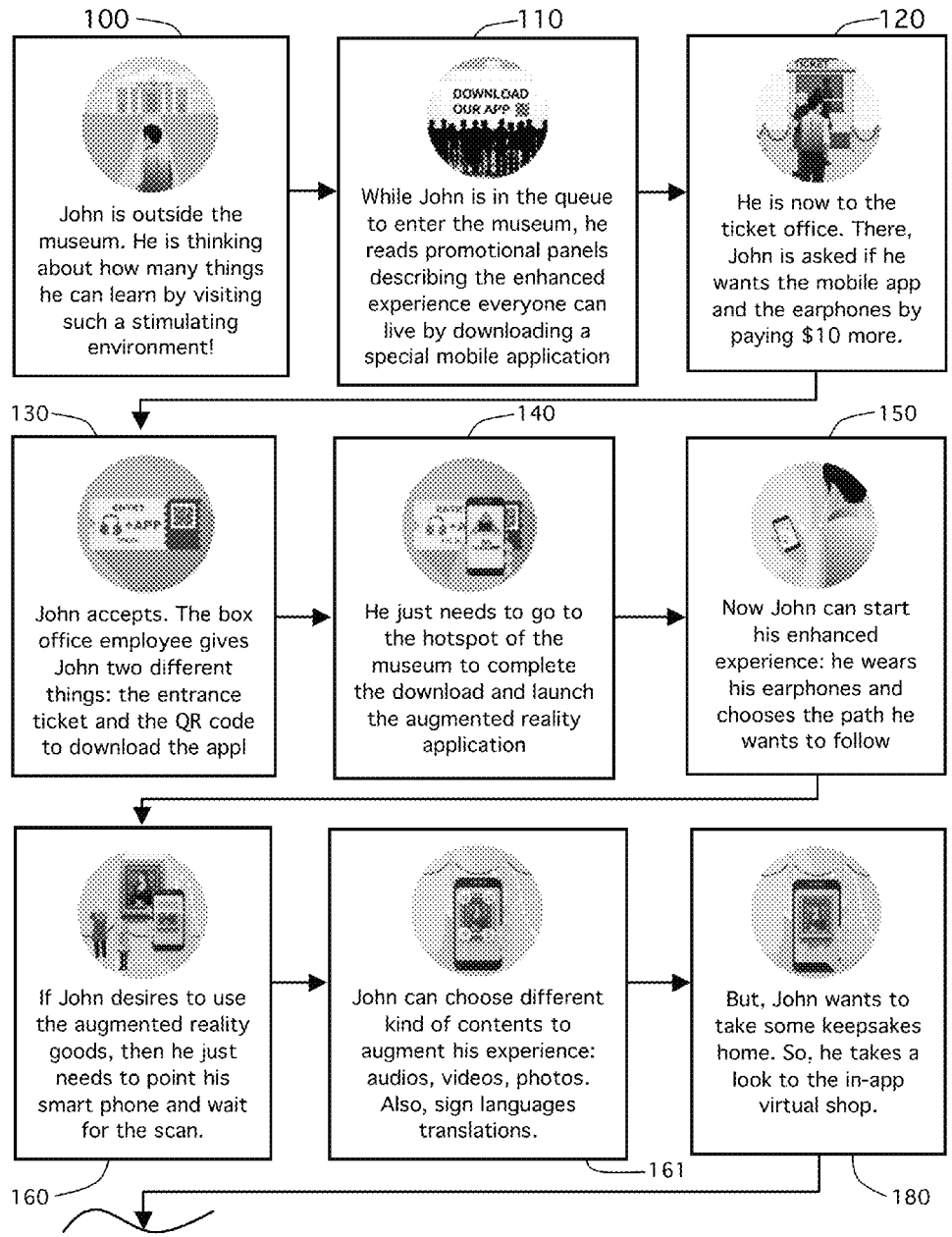
FIG. 4 is an embodiment illustrational flowchart of the present invention as utilized by a user in a museum environment.
Figure 4:
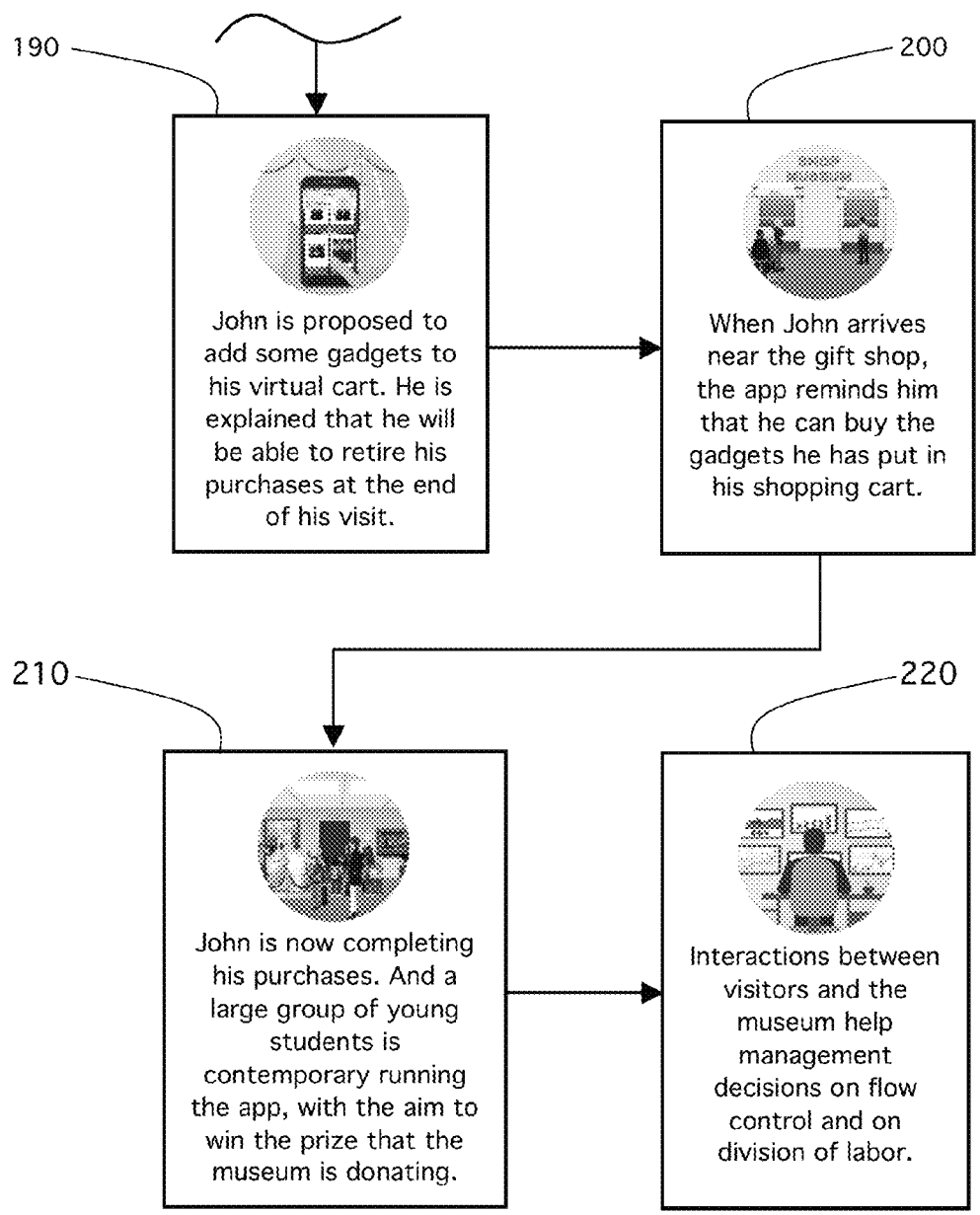

Seen in FIG. 4, is an example illustrational flowchart of present invention 10 as utilized in a museum environment.

At step 100, a user is outside of a museum M. For purposes of this example, the user is named "John" and he is thinking about how many things he can learn by visiting such a stimulating environment!

At step 110, while John is in queue to enter museum M, he reads promotional panels describing the enhanced experience everyone can live by downloading a special mobile application of present invention 10.

At step 120, he is now at the ticket office. There, John is asked if he wants the mobile application of present invention 10 and earphones by paying an additional monetary amount, $10 as an example.

At step 130, John accepts. The museum box office employee gives John a museum entrance ticket and a QR code to download the mobile application of present invention 10.

At step 140, John goes to a hotspot at museum M to complete the download and launch the mobile application of present invention 10.

At step 150, John can now start his enhanced experience. He wears his earphones and starts a walking path of his choice.

At step 160, if John desires to use present invention 10, then he just needs to utilize his computer device 250, seen in FIG. 3, and scans a desired target T being artwork including, but not limited to, a painting, sculpture, relic, and photo, and/or cultural site.

At step 161, John can choose different kinds of content to augment his experience, including but not limited to: audios, videos, photos, and sign language translations.

At step 180, John wants to take some keepsakes home, so he takes a look at a shop within the mobile application of present invention 10.

At step 190, John is prompted to add goods and/or services to his virtual cart. He is informed that he will be able to collect his purchases at the end of his visit.

At step 200, John arrives near the giftshop, the mobile application of present invention 10 reminds him that he can purchase the goods and/or services he has put in his shopping cart.

At step 210, John completes his purchases from the gift shop. And a large group of young students is contemporary running the mobile application of present invention 10, with the aim to win a prize that museum M is donating.

At step 220, interactions between visitors and the museum help museum management make decisions on flow control and on division of labor.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A museum augmented reality platform, consisting of:
A) an augmented reality board consisting of a filter module, a core module, a bus module and a base module, said filter module consisting of a field programmable gate array technology module and a memory cell, said bus module consisting of a hub and parallel bus and said base module consisting of an Ethernet interface;
B) an application server comprising an Ethernet peripheral; and
C) a computer network, said augmented reality board adopts different formats of raw data packets including images and streaming of data of a target as multimedia sources transmit said raw data packets via said computer network to analyze content in real time using said augmented reality board, said target is artwork consisting of one of a painting, a sculpture, a relic, and a photo, said multimedia sources are computer devices that are computers, smart phones, mobile devices, and tablets, said computer devices receive said content via respective input sources, and send raw data packets via said computer network to said augmented reality board, said augmented reality board processes said raw data packets and sends results to said application server, and said input sources are microphones, cameras, and video cameras, said augmented reality board is utilized in a museum environment having said target, whereby a mobile application is downloaded onto said computer devices and said mobile application launches to utilize in said museum environment and scanning desired said target, said mobile application is downloaded onto said computer devices by paying a monetary amount, said content includes audios, videos, photos, and sign language, said mobile application comprises a shop, said shop comprises goods and services to that may be added to a virtual cart, said mobile application informs when purchases may be collected at a gift shop, said mobile application is utilized to win a prize that a museum is donating, and said mobile application is utilized for interactions between visitors and a museum to help museum management make decisions on flow control and on division of labor.

2. A museum augmented reality platform, consisting of:
A) an augmented reality board consisting of a filter module, a core module, a bus module and a base module, said filter module consisting of a field programmable gate array technology module and a memory cell, said bus module consisting of a hub and parallel bus and said base module consisting of an Ethernet interface, said filter module is synthesized to process data;
B) an application server comprising an Ethernet peripheral; and
C) a computer network, after processing said data, said data is transmitted to said core module composed of microcontrollers that manage information and compares a result with content in a database of said core module, a plurality of augmented reality boards can be connected together with said bus module, an interconnection is possible via said base module that provides said Ethernet interface and electronics for a power supply to each said augmented reality board, specific said filter module may be added onto said augmented reality board, depending on content type, which can act simultaneously, said data is artwork consisting of one of a painting, a sculpture, a relic, and a photo scanned with multimedia sources, said multimedia sources are computer devices that are computers, smart phones, mobile devices, and tablets, said augmented reality board processes said data and sends results to said application server, said augmented reality board is utilized in a museum environment having said artwork, whereby a mobile application is downloaded onto said computer devices and said mobile application launches to utilize in said museum environment and scanning desired said artwork, said mobile application is downloaded onto said computer devices by paying a monetary amount, said data includes audios, videos, photos, and sign language, said mobile application comprises a shop, said shop comprises goods and services to that may be added to a virtual cart, said mobile application informs when purchases may be collected at a gift shop, said mobile application is utilized to win a prize that a museum is donating, and said mobile application is utilized for interactions between visitors and a museum to help museum management make decisions on flow control and on division of labor.

3. A museum augmented reality platform, consisting of:
A) an augmented reality board consisting of a filter module, a core module, a bus module and a base module, said filter module consisting of a field programmable gate array technology module and a memory cell, said bus module consisting of a hub and parallel bus and said base module consisting of an Ethernet interface, said bus module receives a raw data packet and transmits said raw data packet via said hub;
B) an application server comprising an Ethernet peripheral; and
C) a computer network, after receiving said raw data packet, said augmented reality board decodes said raw data packet and applies a filter, said raw data packet is processed in said filter module, if processing in said filter module is successful, there is collecting of processed data, whereby said memory cell contains expandable logic cells to implement static memory for said field programmable gate array technology module, after processing said raw data packet, results are sent to said core module that communicates with said application server comprising said Ethernet peripheral, if processing in said filter module is not successful, a report is issued and said application server evaluate results to recognize content, said raw data packet is artwork consisting of one of a painting, a sculpture, a relic, and a photo scanned with multimedia sources, said multimedia sources are computer devices that are computers, smart phones, mobile devices, and tablets, said augmented reality board processes said raw data packet and sends results to said application server, said augmented reality board is utilized in a museum environment having said artwork, whereby with a code a mobile application is downloaded onto said computer devices and said mobile application launches to utilize in said museum environment and scanning desired said artwork, said mobile application is downloaded onto said computer devices by paying a monetary amount, said raw data packet includes audios, videos, photos, and sign language, said mobile application comprises a shop, said shop comprises goods and services to that may be added to a virtual cart, said mobile application informs when purchases may be collected at a gift shop, said mobile application is utilized to win a prize that a museum is donating, and said mobile application is utilized for interactions between visitors and a museum to help museum management make decisions on flow control and on division of labor.

* * * * *